Oct. 2, 1934.   J. BOHLI   1,975,680

CENTRIFUGAL GOVERNOR

Filed Sept. 9, 1933

Inventor
Jakob Bohli

Patented Oct. 2, 1934

1,975,680

UNITED STATES PATENT OFFICE 1,975,680

CENTRIFUGAL GOVERNOR

Jakob Bohli, Solothurn, Switzerland

Application September 9, 1933, Serial No. 688,854
In Germany September 14, 1932

5 Claims. (Cl. 64—90.5)

This invention relates to centrifugal governors of the known kind having fly weights of different weight which are disposed symmetrically with respect to the part to be displaced. In such governors, the purpose of which is to displace the moment of ignition for instance of magneto-electric ignition apparatus, the centrifugal weights are accelerated and retarded, owing to the magneto-electric conditions, more particularly at the moment of the magnetic rupture, that is to say are moved out of their stable position in one direction of rotation or the other. The driving shaft is for the same reasons also accelerated or retarded, causing a sudden change to occur in the flank contact of the teeth of the driving wheels or of the teeth of an interposed claw coupling. These conditions do not always permit of noiseless running of the machine, with the result that there may also be a more rapid wear of the various parts. In the known arrangements all the fly weights are disposed on a plate which is rigidly connected to the driving shaft. Owing to this arrangement impacts coming from the driving side, that is from the motor, are transmitted without any damping to the fly weights, which is undesirable as regards accuracy in operation and as regards wear.

The invention consists more particularly in this that braking means for the fly weights and other braking means for the driving shaft are provided, the latter of which carries only the displacing cam, while the fly weights turn about pins which are connected to the parts to be displaced.

Figure 1:
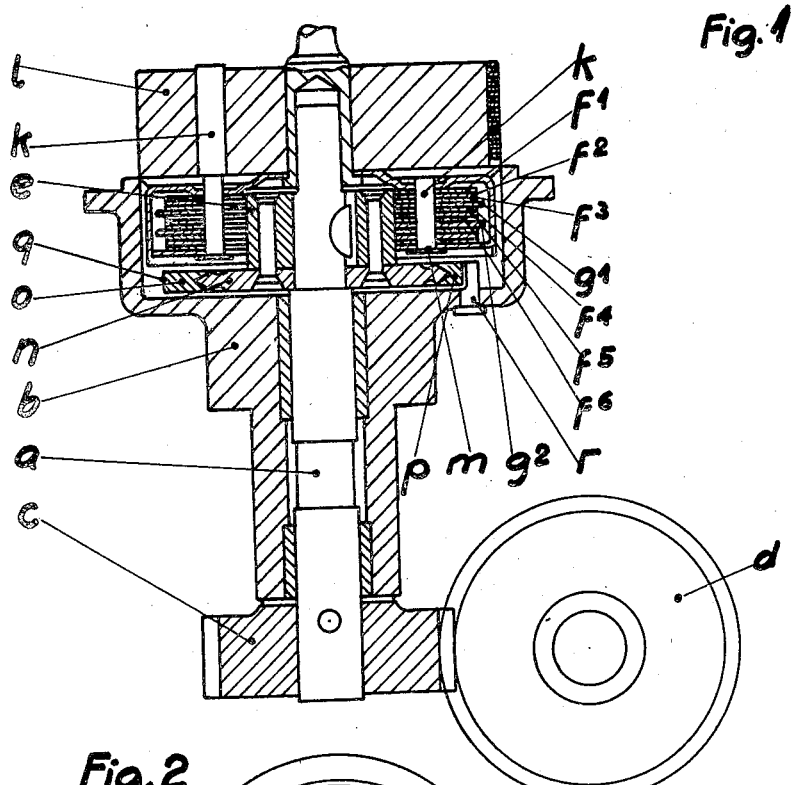
Figure 2:
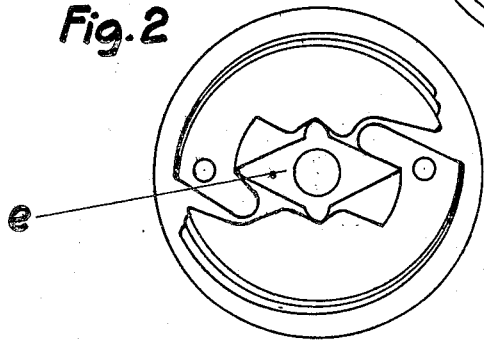
Figure 3:
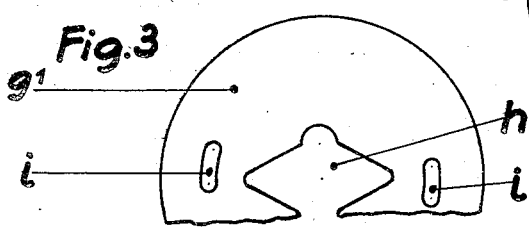
Figure 4:
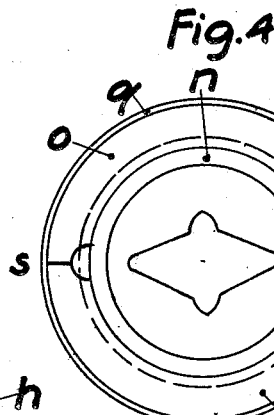

A constructional example of the arrangement according to the invention is illustrated in the accompanying drawing, in which Figure 1 is a vertical section through the governor arrangement, Figure 2 shows in plan the position of three of the fly weights with respect to the displacing cam, Figure 3 is a plan view of one of the brake discs, and Figure 4 shows in plan the elements of the braking means for the driving shaft.

In the figures $a$ is the driving shaft, $b$ the bearing support, $c$ the driving wheel fixed on the driving shaft, which meshes with the wheel $d$. On the driving shaft is also keyed the displacing cam $e$ which coacts in a known manner with the arms of the fly weights $f_1$, $f_2$, $f_3$, and so on. Between $f_3$ and $f_4$ and after the fly weight $f_6$ a brake disc $g_1$ or $g_2$ is in each case interposed, which discs have the form shown in Figure 3. These brake discs $g$ have a central opening $h$ in the form of the displacing cam $e$, by which they are carried round. Through the slots $i$ of these brake discs there extend pins $k$ on which the fly weights $f_1$, $f_2$ and so on are pivoted. The length of these slots is made to correspond to the maximum range of displacement of the governor. $l$ is the part of the device to be displaced, to which the pin $k$ is rigidly connected. By means of the spring ring $m$ the fly weights are held together with the brake discs. When the motion of the driven part is irregular with respect to the driving part the fly weights are lightly braked by the two brake discs, whereby a smooth motion of the governor weights is ensured. Similarly, the play between the two toothed wheels $c$, $d$ or, when a claw coupling is provided, the play between the claws, results in the arrangement running noisily. This is overcome through the provision for the driving shaft $a$ as well of a braking device which consists substantially of a brake disc $n$ and two brake members $o$, $p$. These two brake members are held together by a spring ring $q$ which is disposed in a groove of the brake members, and are prevented from turning by a pin $r$, mounted in the support $b$. The two brake members do not form a closed circular body but have at their end a small space, such that the two members make contact with one another at $s$ or at $t$, according to the direction of rotation, with the result that in both directions of rotation practically the same braking effect is obtained. This braking device also ensures smooth running of the driving wheels. Furthermore, owing to the fact that besides the light brake discs $g_1$, $g_2$, only the displacing cam $e$ is connected to the driving shaft $a$, while the fly weights are on pins fixed in the driven part, which in the example shown, is the heavy magnet pole wheel, impacts from the driving side will not be transmitted to the driven part.

What I claim is:—

1. A centrifugal governor for internal combustion engines, having fly weights of different weights which are arranged symmetrically with respect to the displacing part, characterized by the feature that one braking device is provided for the fly weights and a second for the driving shaft, which carries substantially only the displacing cam, while the fly weights turn on pins which are connected to the part to be displaced.

2. A centrifugal governor for internal combustion engines as claimed in claim 1, characterized by the feature that at least two brake discs are arranged in a uniform manner between the fly weights and are in positive connection with the displacing cam of the driving shaft.

3. A centrifugal governor for internal combustion engines as claimed in claim 1, wherein at least two brake discs are arranged in a uniform manner between the fly weights and are in positive connection with the displacing cam of the driving shaft, characterized by the feature that the brake discs have central openings corresponding to the displacing cam on the driving shaft and are provided towards the periphery with slots arranged symmetrically with respect to the axis of rotation, through which the pins extend, on which the fly weights are pivoted.

4. A centrifugal governor for internal combustion engines as claimed in claim 1, characterized by the feature that a brake disc is fixed on the driving shaft and coacts at its periphery with two brake members.

5. A centrifugal governor for internal combustion engines as claimed in claim 1, wherein a brake disc is fixed on the driving shaft and coacts at its periphery with two brake members, characterized by the feature that the two semicircular brake members which are pressed against the brake discs by a spring ring inserted around their periphery and together do not form a completely closed circular body, so that only one or the other of the ends of the brake members come in contact with one another according to the direction of rotation and that the brake members are prevented from turning by a pin provided on the bearing support.

JAKOB BOHLI.